United States Patent [19]
Harrell et al.

[11] 3,932,836
[45] Jan. 13, 1976

[54] DC/AC MOTOR DRIVE FOR A DOWNHOLE ACOUSTIC TRANSMITTER IN A LOGGING-WHILE-DRILLING SYSTEM

[75] Inventors: John W. Harrell, Duncanville; Wallace B. Allen, Dallas, both of Tex.

[73] Assignee: Mobil Oil Corporation, New York, N.Y.

[22] Filed: Sept. 18, 1974

[21] Appl. No.: 507,171

Related U.S. Application Data

[63] Continuation of Ser. No. 433,029, Jan. 14, 1974, abandoned.

[52] U.S. Cl. ........ 340/18 LD; 340/18 CM; 318/171; 318/231; 175/40
[51] Int. Cl.² ......................................... G01V 1/40
[58] Field of Search..... 340/18 LD, 18 CM; 175/40, 175/50; 166/113; 73/DIG. 6; 318/231, 171

[56] References Cited
UNITED STATES PATENTS

| | | | |
|---|---|---|---|
| 2,810,546 | 10/1957 | Eaton et al. | 340/18 CM |
| 3,309,656 | 3/1967 | Godbey | 324/1 |
| 3,471,763 | 10/1969 | Germann et al. | 318/171 |
| 3,700,987 | 10/1972 | Deering | 318/231 |
| 3,800,277 | 3/1974 | Patton et al. | 340/18 LD |
| 3,855,510 | 12/1974 | Houck | 318/171 |

*Primary Examiner*—Maynard R. Wilbur
*Assistant Examiner*—S. C. Buczinski
*Attorney, Agent, or Firm*—C. A. Huggett; George W. Hager, Jr.

[57] ABSTRACT

In a system for logging while drilling, a downhole turbine is rotated by the hydraulic power in the circulating drilling fluid to provide mechanical power that is converted to regulated DC power. The DC power is converted to two-phase AC power by a DC/AC motor drive. The frequency of the two-phase AC power output of the DC/AC motor drive is modulated by the output of a downhole transducer which monitors a selected downhole condition. A two-phase AC induction motor is driven by the DC/AC motor drive at a speed which changes with the frequency modulation of the two-phase AC power. The induction motor drives an acoustic transmitter which interrupts the circulating drilling fluid to produce an acoustic wave in the drilling fluid that is frequency modulated in response to changes in the condition being measured by the downhole transducer.

9 Claims, 6 Drawing Figures

DC/AC MOTOR DRIVE FOR A DOWNHOLE ACOUSTIC TRANSMITTER IN A LOGGING-WHILE-DRILLING SYSTEM

This is a continuation, division of application Ser. No. 433,029, filed Jan. 14, 1974, now abandoned.

BACKGROUND OF THE INVENTION

This invention relates generally to logging while drilling wherein measurements of downhole conditions within a borehole are telemetered to the surface of the earth by means of a downhole acoustic transmitter which produces a continuous acoustic wave that passes upward through the drilling fluid. More particularly, it relates to a DC/AC motor drive that converts a DC power source to an AC power source for operating a two-phase AC induction motor in the downhole acoustic transmitter.

In the past, a conventional practice in the logging of a borehole has been to apply electric current from a suitable source aboveground through an insulated conductor extending into the borehole to sensing apparatus. The sensing apparatus provides a signal in the insulated conductor representative of the characteristic measured within the borehole. The provision and maintenance of such an insulated conductor for logging the borehole while simultaneously drilling the borehole has been found to be impractical.

More recently, logging-while-drilling systems have been employed which do not require an insulated conductor in the borehole at any time for logging operations. In one such system, the sensing apparatus located within the borehole transmits the logging measurements by means of an acoustic wave passing upward through the drill string. An example of such a system is disclosed in U.S. Pat. No. 2,810,546 to B. G. Eaton et al. In another such system the drilling liquid within the borehole is utilized as the transmission medium for the information-bearing acoustic waves. An example of such a system is disclosed in U.S. Pat. No. 3,309,656 to John K. Godbey. In the Godbey systems, drilling fluid is continuously circulated downward through the drill string and drill bit and upward through the annulus provided by the drill string and the borehole wall, primarily for the purpose of removing cuttings from the borehole. An acoustic transmitter located downhole continuously interrupts the flow of the drilling fluid, thereby generating an acoustic wave in the drilling fluid. The acoustic wave is modulated with information measured downhole by sensing apparatus, and the modulated acoustic wave is telemetered uphole through the drilling fluid to suitable recording equipment.

SUMMARY OF THE INVENTION

In the logging of a well a drilling fluid is circulated through a housing inserted into a borehole. A rotary-driven turbine is driven by the hydraulic power in the fluid and generates mechanical power that is in turn converted to a direct-current voltage source by an alternator and regulator.

A transducer located within the borehole provides an output signal representative of a selected downhole condition. This output signal from the transducer is utilized to modulate the frequency of clock pulses provided by a pulse generator. These clock pulses are then utilized to produce first, second, third, and fourth square wave signals which are sequentially 90° out of phase with each other, the frequency of these four square wave signals being proportional to the frequency of the clock pulses.

The direct-current voltage source and the four square wave signals control the operation of a two-phase AC induction motor. The motor is driven from the direct-current voltage source by alternating the direction of the current flow from the voltage source through the first-phase winding of the motor in response to the first and third square wave signals, which being 180° out of phase, are complementary signals and by alternating the direction of current flow from the voltage source through the second-phase winding of the motor in response to the second and fourth square wave signals which are also complementary signals. In this manner, the two-phase AC induction motor is supplied with alternating-current flow through both its 90°-phase windings, such alternating-current flow being frequency modulated by the output signal from the transducer in accordance with the measured downhole condition.

The induction motor drives an acoustic transmitter which periodically interrupts the flow of drilling fluid through the housing to produce a continuous acoustic wave in the drilling fluid which is frequency modulated in response to changes in the downhole condition being measured by the transducer. After passing upward through the drilling fluid to the surface of the earth, the acoustic signal is demodulated to provide a readout of the measured downhole condition.

In a further aspect, the four square wave signals are provided by a pair of flip-flops connected to form a ring counter. The ring counter is clocked by the clock pulses from the pulse generator. Both flip-flops of the ring counter provide a pair of complementary output square waves, the pair of square waves from the second flip-flop of the ring counter being shifted 90° from the complementary pair of square waves from the first flip-flop of the ring counter.

In a still further aspect, the direct-current voltage source is connected to the two-phase AC induction motor through two pair of switches. The first pair of switches operate alternately to reverse the polarity of the connection of the direct-current voltage source to the first-phase winding of the induction motor to thereby provide for an alternating-current flow through the winding. One of the first pair of switches is closed during the positive transition of the first square wave signal, and the other of the first pair of switches is closed during the positive transition of the third square wave signal. A second pair of switches operate to alternately reverse the polarity of the connection of the direct-current voltage source to the second-phase winding of the induction motor to thereby provide for an alternating-current flow through the winding. One of the second pair of switches is closed during the positive transition of the second square wave signal and the other of the second pair of switches is closed during the positive transition of the fourth square wave signal.

DESCRIPTION OF THE PREFERRED EMBODIMENT

In accordance with the present invention a DC/AC motor drive converts DC power to AC power for starting and operating a downhole acoustic transmitter in a logging-while-drilling system. The digital signals representing downhole condition measurements control the frequency of the AC power. As the frequency is changed, the acoustic transmitter is modulated to provide an acoustic signal representing the downhole condition measurements. The DC/AC motor drive of the present invention is particularly suitable for inclusion in a logging-while-drilling system which utilizes conventional rotary drilling apparatus. A brief description of a conventional rotary drilling apparatus with which this invention can be used will be given prior to the detailed description of the invention itself.

Figure 1:
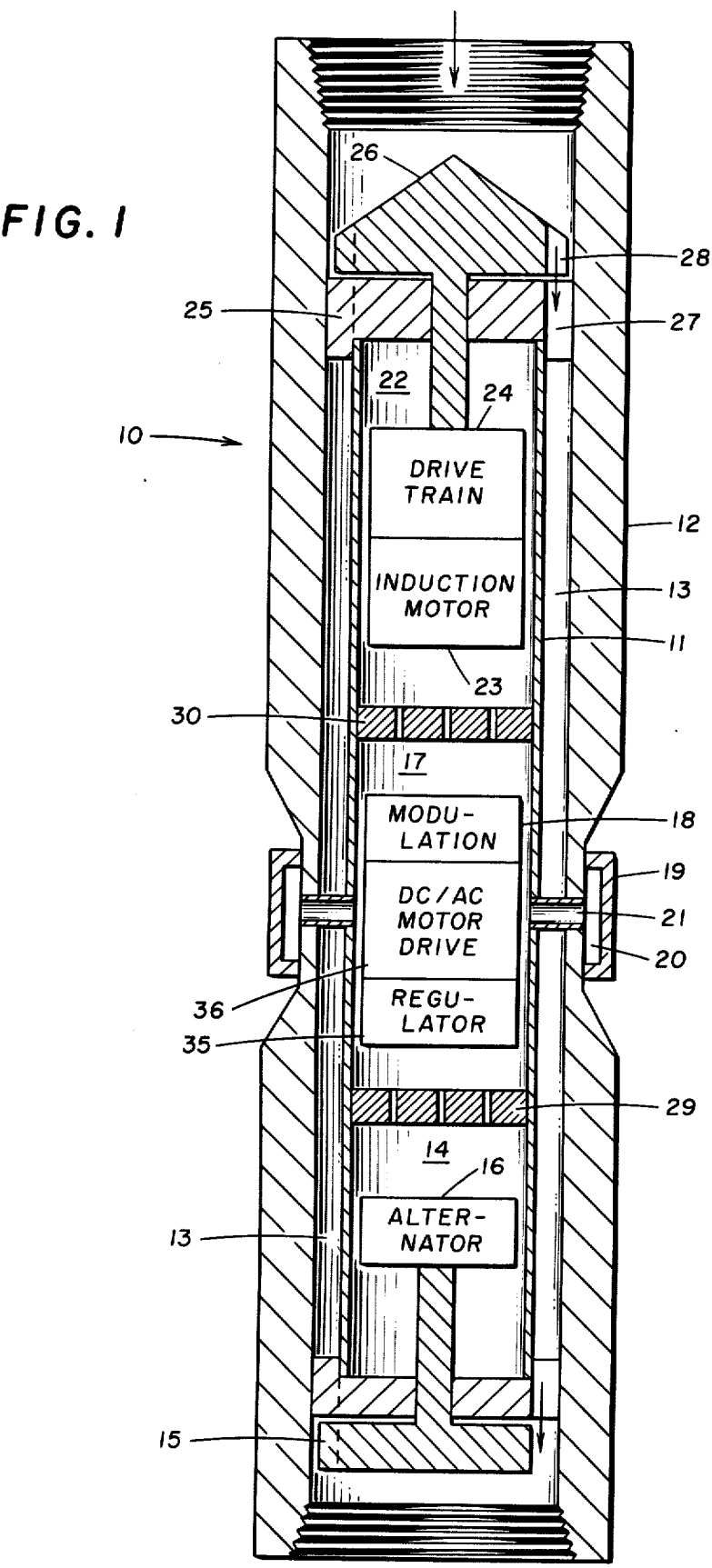
FIG. 1 is a cross-sectional view of a borehole logging tool utilized in a logging-while-drilling system.

In FIG. 1 there is shown a downhole logging tool 10 formed by an inner housing 11 located within an outer housing 12. The inner and outer housings define an annulus 13 through which drilling mud passes during drilling operations. The upper and lower ends of the outer housing 12 are threaded for connection into a drill string. Within the inner housing 11 are contained the operating parts of the logging-while-drilling system, the power source, the modulation section, the acoustic transmitter, and the transmitter controller.

The power requirements for the acoustic transmitter are derived from a power source comprising the mud turbine 15, the alternator 16, the voltage regulator 35, and the DC/AC motor drive 36. The mud turbine 15 is located immediately below the lower section 14, and the alternator 16 is located within the lower section 14. During the drilling operations, drilling fluid, preferably "mud", is continuously circulated through the drill bit by a positive displacement pump located aboveground, primarily to remove cuttings from the hole. There is substantial hydraulic power in this drilling mud. In the logging-while-drilling system, this drilling mud is passed through the annulus 12, and the hydraulic power is converted to mechanical power by means of the mud turbine 15. Mud turbine 15 drives the alternator 16 to convert the mechanical power to AC electrical power. Located within a middle section 17 is the voltage regulator 35 which rectifies and filters the AC power output from the alternator 16 and provides a regulated DC power output. The DC/AC motor drive 36 converts the DC power into suitable AC power for starting and operating the acoustic transmitter. The middle section 17 is sealed from the lower section 14 by means of bulkhead 29. The electrical connection from the alternator 16 to the voltage regulator 35 passes through this bulkhead.

Also located near and in communication with middle section 17 are the various types of transducers used to convert such downhole conditions as fluid pressures and temperatures, drilling conditions and parameters, and formation characters into analog electrical signals. These analog signals are applied to the modulation section 18 for conversion into digital signals for use in modulating the acoustic transmitter. The collar 19 surrounding the outer housing 12 provides a compartment 20 within which the transducers may be located. The transducers communicate with the modulation section 18 by means of the channel 21 leading from compartment 20 into the middle section 17.

Located within an upper section 22 is an induction motor 23 and a drive train 24. An acoustic generator comprising a fixed stator 25 and a rotary valve 26 is located immediately above the upper section 22. These four components, induction motor 23, drive train 24, stator 25, and rotary valve 26, comprise the acoustic transmitter. Rotary motion of the rotary valve 26 is initiated and maintained by the induction motor 23 which is connected rigidly to the rotating valve through the drive train 24. The induction motor 23 is electrically connected to the DC/AC motor drive 36 through the bulkhead 30 which seals the middle section 17 from the upper section 22. The stator 25 and the rotary valve 26 have complementing slots 27 and 28. The rotor is in an open position when the slot 28 is rotated to a position which is in communication with the slot 27 of the stator 25. In this open position, the drilling mud will pass through the slots in the rotor and stator and through the annulus 13 to drive the turbine 15. The hydraulic power in the drilling mud is converted by the turbine 15 to mechanical power which in turn is converted to electrical power for rotating the rotary valve 26. As the valve 26 is rotated, it continuously interrupts the flow of mud, thereby generating the acoustic signal which travels upward through the mud column to the surface of the earth.

This acoustic signal may be modulated with the digital signals which represent the downhole condition measurements from the transducers. These digital signals are utilized within the modulation section 18 to control the frequency of the AC power applied to the induction motor 23 and, consequently, the speed of the induction motor 23. As it is the speed of the induction motor which determines the frequency of the acoustic signal, the acoustic signal is therefore frequency modulated in response to the digital signals representing the downhole conditions measured by the logging transducers. In this manner, modulated, continuous, acoustic waves travel uphole in the drilling mud and are received at the earth's surface and demodulated to provide a readout of the downhole conditions.

Figure 2:
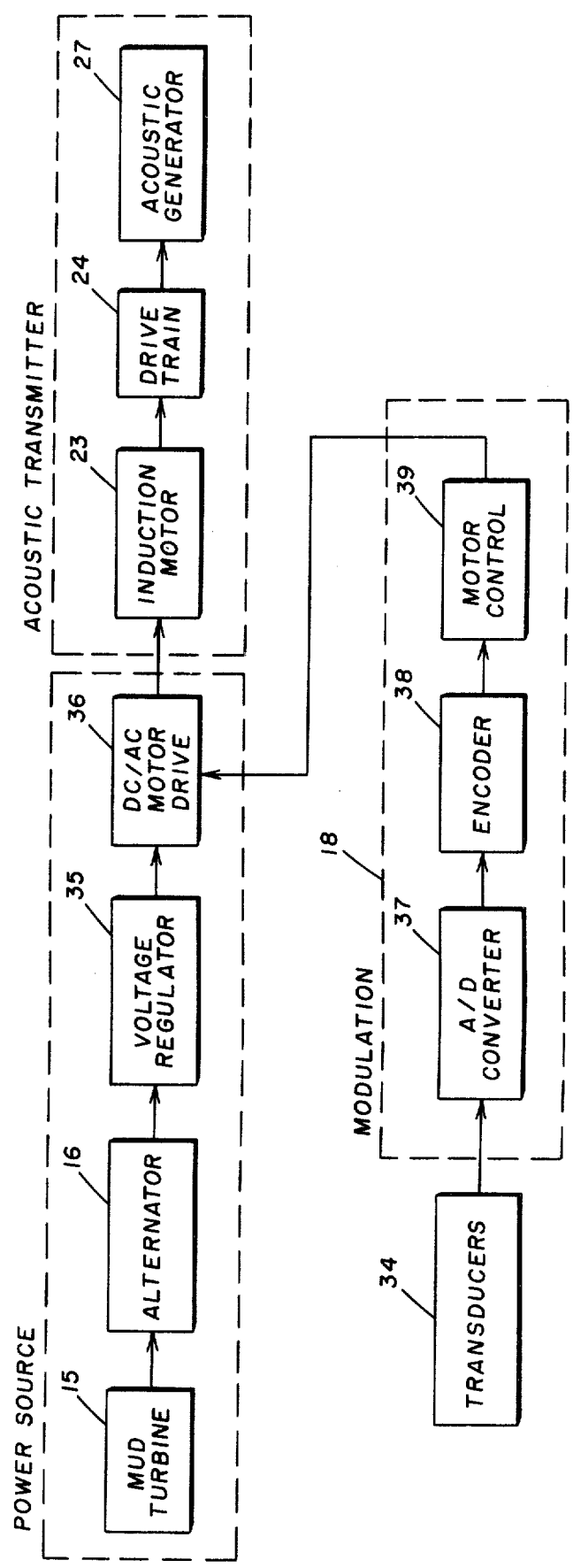
FIG. 2 is a flow diagram illustrating the components housed within the borehole logging tool of FIG. 1.

Referring now to FIG. 2, there is illustrated in flow diagram the details of the borehole logging tool illustrated in FIG. 1. As previously described, the mud turbine 15 converts the hydraulic power in the drilling mud to mechanical power for driving the alternator 16 which, preferably, is a three-phase, six-pole alternator. The three-phase, AC power from the alternator 16 is applied to a voltage regulator 35 which rectifies and filters the AC power output from the alternator and provides a regulated DC voltage output. This regulated DC voltage is converted by a DC/AC motor drive 36 into suitable AC power for starting and operating the induction motor 23 in the acoustic transmitter.

The downhole measurements of the transducers 34, in analog form, are coded into binary digital words by an A/D converter 37. Each digital word is converted into serial binary bits by an encoder 38 and applied to motor control 39 which in turn regulates the frequency of the AC power applied from the DC/AC motor drive 36 to the induction motor 23, consequently varying the speed of the induction motor 23 and thereby modulating the acoustic signal output from the acoustic generator 27 in accordance with the digital information applied to the motor control circuit 39.

An example of the type of borehole logging tool illustrated in FIGS. 1 and 2 is set forth in copending United States patent application Ser. No. 213,061 of Bobbie J. Patton, filed Dec. 28, 1971, the disclosure of which is incorporated herein by reference. As previously pointed out, it is the specific feature of the present invention to provide a new and improved DC/AC motor drive for use in such a borehole logging tool.

Figure 3:
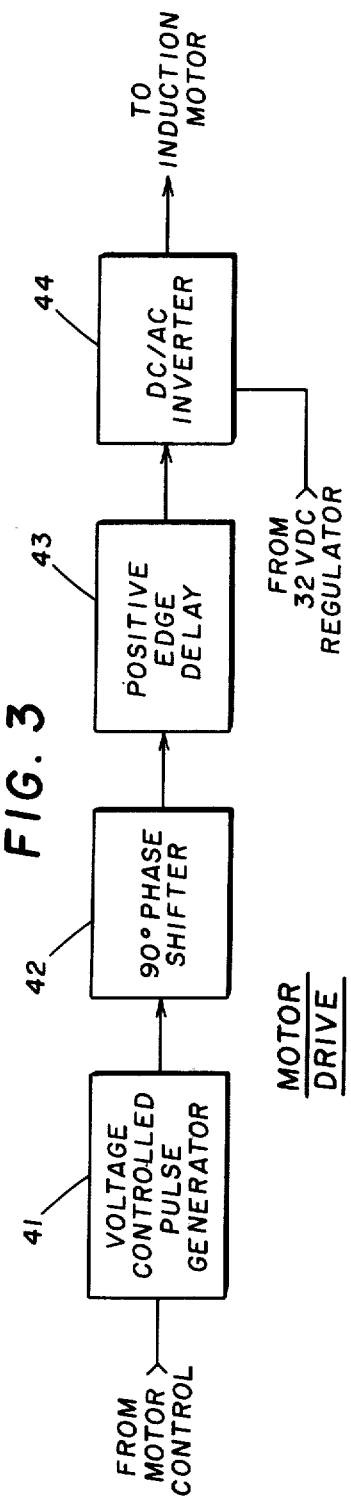
FIG. 3 is a block diagram schematic of the DC/AC motor drive unit of FIG. 2.

Referring now to FIG. 3, there is illustrated in block diagram the DC/AC motor drive of the present invention comprising a voltage-controlled pulse generator 41 which generates clock pulses at a basic frequency which is then regulated by the DC input voltage from the motor control 39 of the modulation section 18, a 90°-phase shifter 42 which converts the clock pulses from the voltage-controlled pulse generator 41 into four square wave signals which are sequentially 90° out of phase and of a frequency equal to one-fourth the frequency of the clock pulses, a positive-edge delay 43 which time delays the positive edges of the square waves from the 90°-phase shifter 42, and a DC/AC inverter 44 that converts a regulated DC power to a two-phase AC power for driving the induction motor 23 of the acoustic transmitter, this AC power being modulated by the time-delayed square waves from the positive-edge delay 43. Each of the units 41-44 will now be individually described in detail in conjunction with the detailed schematic diagrams of FIGS. 4 and 5. Waveforms of various signals of each of these units are illustrated in FIG. 6.

Figure 4:
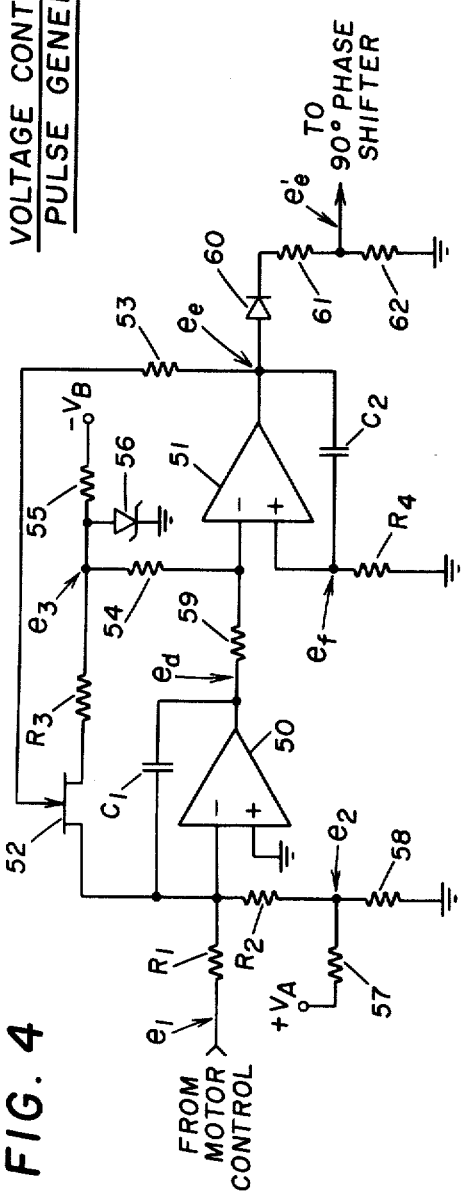
FIGS. 4 and 5 are detailed electrical schematics of the units of the DC/AC motor drive unit of FIG. 3.

The voltage-controlled pulse generator is illustrated in detail in FIG. 4 and comprises an integrator 50, a comparator 51, and an electronic switch 52. The integrator 50 is an operational amplifier which functions as a summing-type integrator to provide the signal $e_d$ which is defined by the following equation:

$$e_d = - \frac{1}{R_1 C_1} \int_{t_1}^{t_2} e_1 dt - \frac{1}{R_2 C_1} \int_{t_1}^{t_2} e_2 dt - \frac{1}{(R_3 + R_S) C_1} \int_0^{t_1} e_3 dt \quad (1)$$

where, $e_1$ = the control signal from a variable voltage source, $e_2$ = a positive reference voltage selected to set the basic frequency of the voltage-controlled pulse generator when $e_1$ is zero, $e_3$ = a negative reference voltage switched to the input of integrator 50 by the switch 52 to reset its output to a predetermined positive level determined by the characteristics of the comparator 51, and $R_S$ = resistance of switch 52.

The comparator 51 is an operational amplifier which compares the signal $e_d$ to the negative reference voltage $e_3$ to provide for the output signal $e_e$. Signal $e_e$ is defined by the following:

$$e_e = [e_f - (e_3 + e_d)] A_o \quad (2)$$

where, $e_f$ = positive feedback of comparator 51 through capacitor $C_2$ and resistor $R_4$, and $A_o$ = open loop gain of comparator 51.

More particularly, when power is initially applied to the voltage-controlled pulse generator, the signal $e_e$ of comparator 51 becomes a pulse of positive voltage, as illustrated in FIG. 6, sufficient to turn switch 52 ON through resistor 53. Switch 52 is a field effect transistor which when turned ON applies the current developed by $e_3$ through resistor $R_3$ and the inherent saturation resistance $R_S$ of the field effect transistor itself to the input of the integrator 50. Voltage $e_3$ is provided by the resistor 55 and the Zener diode 56 in series with the power supply $-V_B$. This current is substantial in comparison to the currents generated by $e_1$ through resistor $R_1$ and $e_2$ through resistor $R_2$, thereby causing the signal $e_d$ of integrator 50 to ramp positive, as illustrated in FIG. 6, at a rate determined by the expression of Equation (1).

When $e_d$ becomes greater than $e_3$, the comparator 51 switches its output signal $e_e$ to a negative voltage sufficient to turn switch 52 OFF. This removes $e_3$ from being input to the integrator 50. Consequently, the integrator's output $e_d$ ramps negative at the rate determined by $e_1$ and $e_2$ in Equation (1). It will be remembered that $e_1$ is the control voltage supplied from a variable voltage source, while $e_2$ is the positive reference voltage supplied by the voltage divider resistors 57 and 58 in series with the power supply $+V_A$. With no control voltage input, that is, with $e_1$ equal to zero, the current flow from the positive reference voltage $e_2$ through the resistor $R_2$ sets the basic frequency of the output pulses $e_e$. When a positive control voltage $e_1$ is provided, the current flow through resistor $R_1$ increases the current input to the integrator 50 and thereby increases the basic frequency of the output pulses $e_e$. Conversely, a negative control voltage $e_1$ provides a current flow through resistor $R_1$ that decreases the current input to the integrator 50 and thereby decreases the basic frequency of the output pulses $e_e$. Upon $e_d$ becoming less than $e_3$, the comparator again switches its output signal $e_e$ to a pulse of positive voltage sufficient to turn switch 52 ON. In this manner the frequency of the output signal is representative not only of the magnitude of the control voltage $e_1$ but also of the sign of the control voltage $e_1$.

Frequency stability of the pulses of the output signal $e_e$ is often important in operations such as logging while drilling where changes in the borehole environmental conditions can cause nominal values of the circuit components in the voltage-controlled pulse generator to drift, thereby causing the frequency of the integrator output $e_d$ to drift. Such drifts due to temperature variations can be attributed to leakage currents of the field effect transistor 52, the temperature coefficient of the Zener diode 56, and changes in the values of the resistors and capacitors. These drifts are cumulative and in a direction that decreases the clock pulse frequency as the temperature increases. Consequently, resistor $R_3$ has a positive temperature coefficient resistance which changes linearly with temperature to thereby achieve the desired frequency stability. In one embodiment, the resistance of resistor $R_3$ includes a fixed resistor $R_3'$ and a positive temperature coefficient sensistor $R_3''$.

In order to operate a two-phase AC motor, it is necessary to apply power from two sources that are 90° out of phase. Consequently, the output $e_e$ of the comparator 51 is applied by way of the diode 60 and resistors 61 and 62 as the signal $e_e'$ to the 90°-phase shifter unit 42 which is illustrated in detail in FIG. 5.

Figure 5:
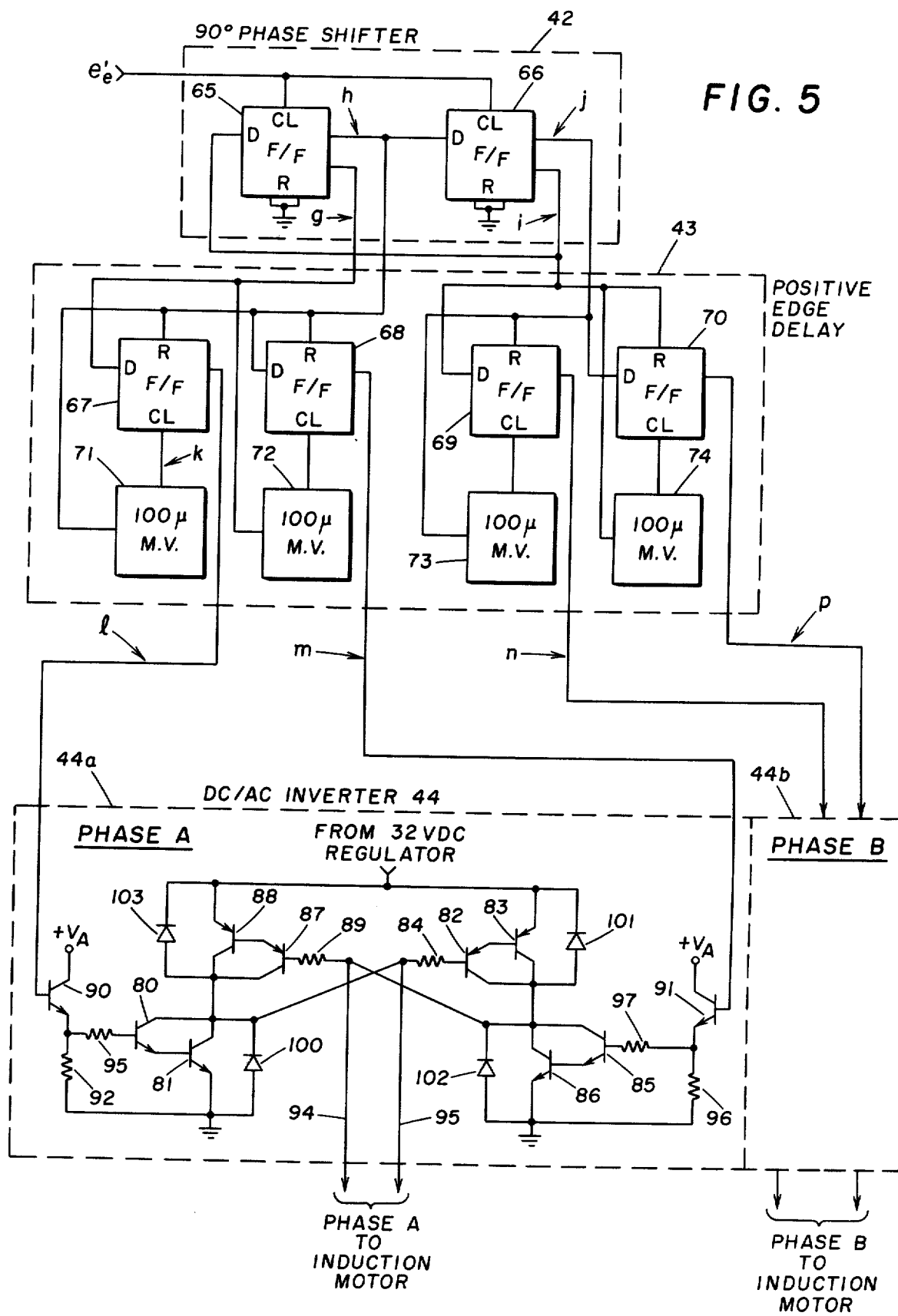
Figure 6:
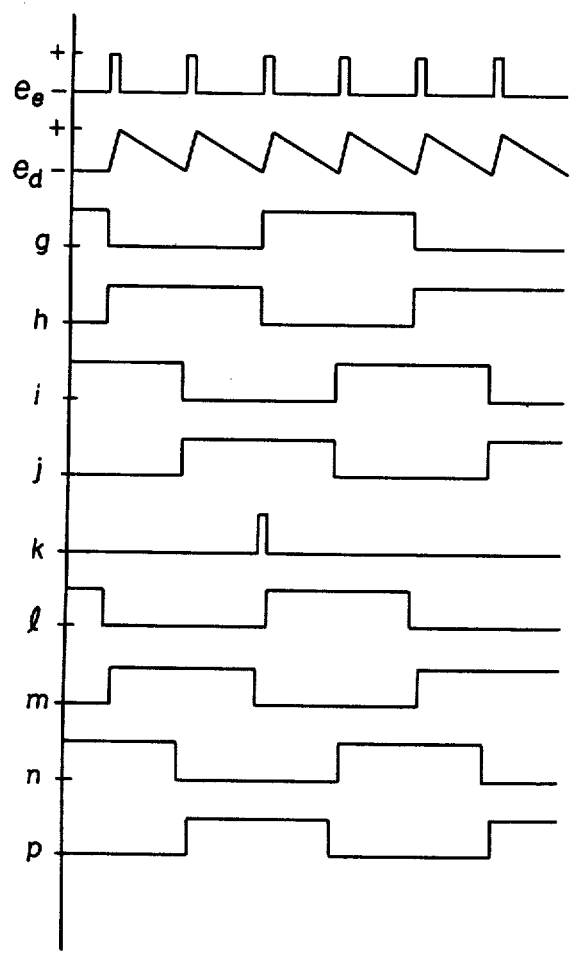
FIG. 6 illustrates the waveforms of various signals appearing at the designated points in the electrical schematic of FIGS. 4 and 5.

Referring now to FIG. 5, the 90°-phase shifter 42 comprises dual-type D flip-flops 65 and 66 connected in the form of a ring counter such that they provide for the four square wave signals $g$, $h$, $i$, and $j$ which are, as illustrated in FIG. 6, 90° out of phase sequentially with respect to each other and are of a frequency which is one-fourth of the frequency of the signal $e_e$ of the voltage-controlled pulse generator 41.

These four signals $g$, $h$, $i$, and $j$ are applied to the positive-edge delay 43 which comprises four type-D flip-flops 67–70 and four 100-microsecond monostable multivibrators 71–74. Each flip-flop inserts a positive-edge delay into the signals $g$, $h$, $i$, and $j$, respectively, to prevent race problems associated with the switching transistors of the DC/AC inverter 44 as will be more fully explained during the detailed description of the DC/AC inverter 44. Only the operation of flip-flop 67 and multivibrator 71 will now be described, as the operation of the other flip-flops and multivibrators is identical. The signal $g$ is applied to the data input D of flip-flop 67. The signal $h$ is applied to the reset input R of the flip-flop 67 and also to the multivibrator 71. On the negative transition of signal $g$, the output $l$ of flip-flop 67 is reset to zero by the signal $h$. On the positive transition of signal $g$, the multivibrator 71 is triggered by the negative transition of the signal $h$ and generates the 100-microsecond pulse $k$, as illustrated in FIG. 6, that clocks the flip-flop 67 at the end of the 100-microsecond period to transfer the signal $g$ to the output of the flip-flops as the positive transition square wave signal $l$. In like manner each of the other signals $h$, $i$, and $j$ are positive-edge delayed to provide for the square wave signals $m$, $n$, and $p$, respectively. Each of the signals $l$, $m$, $n$, and $p$ are illustrated in FIG. 6.

These four positive-edge, delayed signals $l$, $m$, $n$, and $p$ are applied to the DC/AC inverter 44 and control its operation to convert the regulated 32-volt DC power into the necessary 2-phase AC power for driving the 2-phase AC induction motor of the acoustic transmitter. Signals $l$ and $m$ are applied to a phase A inverter 44$a$ and signals $n$ and $p$ are applied to a phase B inverter 44$b$. Both phase A and phase B inverters are identical in configuration and operation. Accordingly, only the phase A inverter will now be described in detail. Phase A inverter 44$a$ includes a pair of switches which are alternately opened and closed by the signals $l$ and $m$. When the first switch of the pair is closed, the second switch is open, and current flow from the inverter to the induction motor winding is in a first direction. Conversely, when the second switch of the pair is closed, the first switch is open, and current flow from the inverter to the induction motor winding is in the opposite direction. Therefore, by alternately operating the two switches, the DC power source is converted into the desired AC power source.

More particularly, the first switch includes transistors 80–83, while the second switch includes transistors 85–88. Also provided are two emitter follower transistors 90 and 91 which are provided for matching the output impedance of the positive-edge delay unit 43 to the input impedance of the DC/AC inverter 44.

Upon the generation of signal $l$ by the positive-edge delay 43, transistor 90 is turned ON and conducts through resistor 92. When turned ON, transistor 90 provides for the current flow through resistor 93 for turning ON transistors 80 and 81. Transistor 81 saturates and forward biases transistor 82 through resistor 84. This saturates transistor 83. With the first switch, including transistors 80–83, now all turned ON, current flows from the collector of transistor 83 to the phase A winding of the induction motor 23 by way of line 94. The current then flows through the phase A winding in a first direction and returns by way of line 95 to the collector of transistor 81.

To reverse the direction of current flow through the phase A winding, the signal $l$ is terminated and the signal $m$ generated. When signal $l$ is terminated, the first switch of transistors 80–83 is turned OFF. Then, when $m$ is generated, the second switch of transistors 85–88 is turned ON. In similar fashion to the operation of the first switch, the signal $m$ is applied by emitter follower 91, resistor 96, and resistor 97 to turn ON transistors 85 and 86 which in turn cause transistors 87 and 88 to turn ON by way of resistor 89. Collector current flow from transistor 88 passes by way of line 95 to the phase A winding. The current thereby flows through the phase A winding and returns by way of line 94 to the collector of transistor 86. Consequently, with the second switch of transistors 85–88 turned ON, the current flow through the phase A winding is in a second direction opposite to that of the current flow when the first switch of transistors 80–83 is turned ON. Reverse current protection is provided for transistors 81, 83, 86, and 88 by means of the shunt diodes 100–103, respectively.

When signal $m$ is terminated, the signal $l$ is again provided to switch the current flow back to the first direction through the phase A winding. Therefore, by repeatedly alternating the opening and closing of the two switches, the current flow from the 32-VDC power source is converted into an alternating-current flow through the phase A winding of the induction motor 23.

In similar fashion, the signals $n$ and $p$, which are 90° out of phase with respect to signals $l$ and $m$, are alternately provided by the positive-edge delay 43 to a pair of switches in the phase B inverter 44$b$ to repeatedly switch the direction of current flow from the 32-VDC power supply through the phase B winding of the induction motor 23.

Having now described the DC/AC motor drive of the present invention in conjunction with the circuitry illustrated in FIGS. 4 and 5, it is to be understood that such circuitry is merely representative of one embodiment. In accordance with such embodiment, the following sets forth specific types and values of the circuit components.

| Reference Designation | Description |
| --- | --- |
| Operational amplifiers 50 and 51 | 1556 (Motorola) |
| Field effect transistor 52 | 2N4857 " |
| Zener diode 56 | 1N823 " |
| Transistors 80 and 85 | 2N3716 " |
| Transistors 81 and 86 | 2N5686 " |
| Transistors 82 and 87 | 2N3792 " |
| Transistors 83 and 88 | 2N5684 " |
| Transistors 90 and 91 | 2N3019 " |
| All type D flip-flops | 4013 (R.C.A.) |
| All NAND gates | 4011 " |
| Sensistor $R_3$" | TM ¼ –150 Ω (Texas Instruments) |
| Diodes 60, 100–103 | 1N914 (Fairchild) |

We claim:

1. A logging-while-drilling tool comprising:

a. an elongated housing adapted for insertion into a borehole, and through which drilling fluid is circulated during drilling operations,
b. a rotary-driven member responsive to the hydraulic power in said drilling fluid for generating mechanical power,
c. means for converting said mechanical power to a direct-current voltage source,
d. at least one downhole transducer providing an output representative of a selected condition within the borehole,
e. a pulse generator providing clock pulses, the frequency of said clock pulses being modulated in response to the output of said transducer,
f. means responsive to said clock pulses for producing first, second, third, and fourth signals which are sequentially 90° out of phase with respect to each other, the frequency of said signals being proportional to the frequency of said clock pulses,
g. a two-phase AC induction motor having first- and second-phase windings 90° out of phase with respect to each other,
h. means for driving said two-phase AC induction motor from said direct-current voltage source by alternating the direction of current flow from said voltage source through the first-phase winding of said motor in response to said first and third signals and by alternating the direction of current flow from said voltage source through the second-phase winding of said motor in response to said second and fourth signals, and
i. an acoustic transmitter driven by said induction motor to periodically interrupt the flow of said drilling fluid through said housing so as to produce a continuous acoustic wave in the drilling fluid, whereby said acoustic wave is frequency modulated in response to changes in the downhole condition being measured by said transducer and, after passing upward through the drilling fluid to the surface of the earth, is demodulated to provide a readout of the measured condition.

2. The logging-while-drilling tool of claim 1 wherein said means for producing said signals comprises:

a pair of flip-flops connected in the form of a ring counter with their clock inputs supplied by said clock pulses, the complementary outputs of the first flip-flop of said ring counter being said first and third signals and the complementary outputs of the second flip-flop of said ring counter being said second and fourth signals, the complementary outputs of said second flip-flop being 90° out of phase respectively with the corresponding complementary outputs of said first flip-flop.

3. The logging-while-drilling tool of claim 1 wherein said means for driving said two-phase AC induction motor from said direct-current voltage source includes:

a. a first pair of switches which alternately operate to reverse the connection of said first-phase winding to said direct-current voltage source to thereby provide for an alternating-current flow through said winding, one of said first pair of switches being closed during the time period of said first signal and the other of said first pair of switches being closed during the time period of said third signal, and
b. a second pair of switches which alternately operate to reverse the connection of said second-phase winding to said direct-current voltage source to thereby provide for an alternating-current flow through said winding, one of said second pair of switches being closed during the time period of said second signal and the other of said second pair of switches being closed during the time period of said fourth signal.

4. In a borehole logging operation employing a drilling string through which a drilling fluid is circulated, the method of converting the hydraulic power in the drilling fluid into alternating-current electrical power for driving a two-phase induction motor in a downhole acoustic transmitter, comprising the steps of:

a. rotating a rotary member in response to the hydraulic power of said circulating drilling fluid to convert said hydraulic power into a source of mechanical power,
b. converting said source of mechanical power into a direct-current voltage source,
c. generating clock pulses,
d. generating four signals at a frequency proportional to said clock pulses, said signals being sequentially time shifted 90° with respect to each other,
e. applying said direct-current voltage source in a first polarity across both first- and second-phase windings of said motor in response to said first and second signals respectively such that the current flow through said second-phase winding lags the current flow through said first-phase winding by 90°, and
f. reversing the polarity of said voltage source across both said first- and second-phase windings in response to said third and fourth signals respectively such that the direction of the current flow through said windings is reversed 180° from the direction of the current flow in step (e), thereby providing an alternating-current flow through said windings in which the current flow through said second-phase winding continually lags the current flow through said first-phase winding by 90°.

5. A logging-while-drilling tool comprising:

a. an elongated housing adapted for insertion into a borehole, and through which drilling fluid is circulated during drilling operations,
b. a rotary-driven member responsive to the hydraulic power in said drilling fluid for generating mechanical power,
c. means for converting said mechanical power to a source of direct-current voltage,
d. an alternating-current motor,
e. means for producing first signals corresponding in number and in phase to the phase windings of said motor,
f. means for producing second signals corresponding in number and in complementary phase to the phase windings of said motor,
g. means for driving said motor from said source of direct-current voltage by alternating the direction of current flow from said source through each phase winding of said motor in response to those ones of said first and second signals that have the same phase and complementary phase respectively as the phase winding, and
h. an acoustic transmitter driven by said motor to periodically interrupt the flow of said drilling fluid through said housing so as to produce a continuous acoustic wave in the drilling fluid.

6. The logging-while-drilling tool of claim 5 wherein said means for driving said motor from said source of direct-current voltage includes a plurality of pairs of switches, one such pair connecting each phase winding of said motor to said source of direct-current voltage, the switches in each of said pairs being alternately operated in response to those ones of said first and second signals that have the same phase and complementary phase respectively as the phase winding.

7. The logging-while-drilling tool of claim 5 wherein said means for producing said first signals and said second signals comprises:
  a. a pulse generator providing clock pulses, and
  b. a plurality of dual output flip-flops connected in the form of a ring counter with their clock inputs supplied by said clock pulses, the complementary outputs of said flip-flops being said first signals and second signals.

8. The system of claim 7 further including:
  a. at least one downhole transducer providing an output representative of a selected condition within the borehole, and
  b. means for changing the frequency of the clock pulses from said pulse generator in response to the output of said transducer, whereby the acoustic wave generated by said acoustic transmitter is frequency modulated in response to changes in the downhole condition being measured by said transducer and, after passing upward through the drilling fluid to the surface of the earth, is demodulated to provide a readout of the measured condition.

9. In a borehole logging operation employing a drilling string through which a drilling fluid is circulated, the method of converting the hydraulic power in the drilling fluid into alternating-current electrical power for driving an alternating-current motor in a downhole acoustic transmitter, comprising the steps of:
  a. rotating a downhole member in response to the hydraulic power of said circulating drilling fluid to convert said hydraulic power into a source of mechanical power,
  b. converting said source of mechanical power into a source of direct-current voltage,
  c. generating a plurality of first signals, one for each phase of said motor, said signals being sequentially time shifted with respect to each other by the number of degrees between the phases of said motor,
  d. generating a complementary signal for each of said first signals,
  e. sequentially applying said source of direct-current voltage in one polarity across the windings of said motor in response to the sequence of occurrence of said plurality of first signals, and
  f. sequentially applying said source of direct-current voltage in an opposite polarity across said windings in response to the sequence of occurrence of said complementary signals.

* * * * *

UNITED STATES PATENT OFFICE
CERTIFICATE OF CORRECTION

PATENT NO. : 3,932,836
DATED : January 13, 1976
INVENTOR(S) : John W. Harrell and Wallace B. Allen It is certified that error appears in the above-identified patent and that said Letters Patent are hereby corrected as shown below:

Column 1, line 6, "continuation, division" should read
--continuation--.

[SEAL]

Signed and Sealed this twentieth Day of April 1976

Attest:

RUTH C. MASON
*Attesting Officer*

C. MARSHALL DANN
*Commissioner of Patents and Trademarks*